(12) United States Patent
Zadesky et al.

(10) Patent No.: US 6,746,638 B1
(45) Date of Patent: Jun. 8, 2004

(54) METHOD OF FORMING A COMPUTER CASING

(75) Inventors: Stephen P. Zadesky, Mountain View, CA (US); Te-Yao Yeh, Lu-Jou (TW); Paul Choiniere, San Francisco, CA (US)

(73) Assignee: Apple Computer, Inc., Cupertino, CA (US)

(*) Notice: Subject to any disclaimer, the term of this patent is extended or adjusted under 35 U.S.C. 154(b) by 157 days.

(21) Appl. No.: 09/585,714

(22) Filed: May 31, 2000

(51) Int. Cl.[7] ............................................... B29C 41/22
(52) U.S. Cl. ........................ 264/135; 264/255; 264/265
(58) Field of Search ..................... 264/135, 1.7, 241, 264/255, 259, 265; 428/412; 427/402, 407.1, 413, 133

(56) References Cited

U.S. PATENT DOCUMENTS

| | | | | |
|---|---|---|---|---|
| 3,496,000 A | * | 2/1970 | Hull et al. | |
| 4,543,291 A | * | 9/1985 | Giles, Jr. et al. | |
| 4,550,058 A | * | 10/1985 | Collins et al. | |
| 5,000,903 A | * | 3/1991 | Matzinger et al. | |
| 5,326,800 A | * | 7/1994 | Horn et al. | 524/94 |
| 5,334,450 A | * | 8/1994 | Zabrocki et al. | |
| 5,583,742 A | * | 12/1996 | Noda et al. | |
| 5,856,371 A | * | 1/1999 | Grimm et al. | |
| 6,007,902 A | * | 12/1999 | Adur et al. | |
| 6,221,436 B1 | * | 4/2001 | Perry et al. | |
| 6,258,443 B1 | * | 7/2001 | Nilsen et al. | |
| 6,262,886 B1 | * | 7/2001 | DiFonzo et al. | 345/905 |
| 6,270,887 B1 | * | 8/2001 | Stocq et al. | |
| 6,270,902 B1 | * | 8/2001 | Tedeschi et al. | |

OTHER PUBLICATIONS http://dictionary.reference.com/search? q=rubber.*

* cited by examiner

*Primary Examiner*—Mark Eashoo
(74) *Attorney, Agent, or Firm*—Blakely, Sokoloff, Taylor & Zafman LLP

(57) ABSTRACT

A method of providing a protective barrier between a plastic casing and a rubber layer molded over the plastic casing. The protective barrier is applied to the plastic casing and then the rubber layer molded onto the plastic casing over the protective barrier. The protective barrier prevents the rubber layer from reacting with the underlying plastic casing. In one embodiment, the plastic casing comprises a polycarbonate resin and the protective barrier comprises a polyurethane coating.

33 Claims, 2 Drawing Sheets

METHOD OF FORMING A COMPUTER CASING

FIELD OF THE INVENTION

The present invention relates to a method of forming a computer casing.

BACKGROUND

Rubber molded over plastic has been known for some time. Recently, translucent plastic pieces having translucent rubber overmoldings have been introduced. The combination of translucent plastic and translucent rubber revealed a previously unrecognized problem. The rubber and plastic do not form a stable interface. The rubber appears to attack the plastic, resulting in cracks and opaque patches appearing in the plastic underneath the rubber overmolding. Such cracks affect the structural integrity of the plastic piece, and the opaque patches are aesthetically unpleasing.

SUMMARY OF THE INVENTION

The present invention provides a method of forming a rubber-overmolded casing that involves applying a protective barrier to at least a part of a plastic piece that is part of the casing and then molding a rubber layer onto at least the part of the plastic piece over the protective barrier. In one embodiment, a polyurethane coating provides a protective barrier between a polycarbonate plastic piece and a rubber layer that prevents the rubber layer from attacking the underlying polycarbonate plastic piece.

DETAILED DESCRIPTION

The present invention provides a method of protecting a plastic piece from being attacked by a rubber overmolding. The present invention will be described below in connection with the Figures and with certain embodiments. In the following description, specific details are set forth to provide a thorough understanding of the present invention, however, those of ordinary skill in the art will appreciate that the present invention may be practiced without these specific details. In other instances, details of well-known steps, structures and techniques have been omitted to avoid obscuring the present invention.

The present invention provides a protective barrier between a plastic piece and a rubber layer overmolded onto the plastic piece. While the present invention may be applied to any rubber layer overmolded onto any plastic piece, the present invention is particularly useful for translucent plastic pieces with translucent rubber overmoldings. Translucent polycarbonate pieces with translucent rubber overmoldings include computer casings such as those incorporated into iBook® portable computers available from Apple Computer, Inc.®.

In a typical rubber overmolding process, a plastic piece is first provided. The plastic piece may be formed by injection molding or other methods know in the art for forming plastic pieces. In injection molding, for example, a plastic resin is melted, and the melted plastic is introduced, or injected, into the mold to be formed into a shape determined by the mold. After the plastic piece has been formed, the plastic piece is placed into a second mold. A melted rubber is introduced into the second mold, and a rubber layer molded over at least a part of the plastic piece in a shape determined by the second mold.

Figure 1:
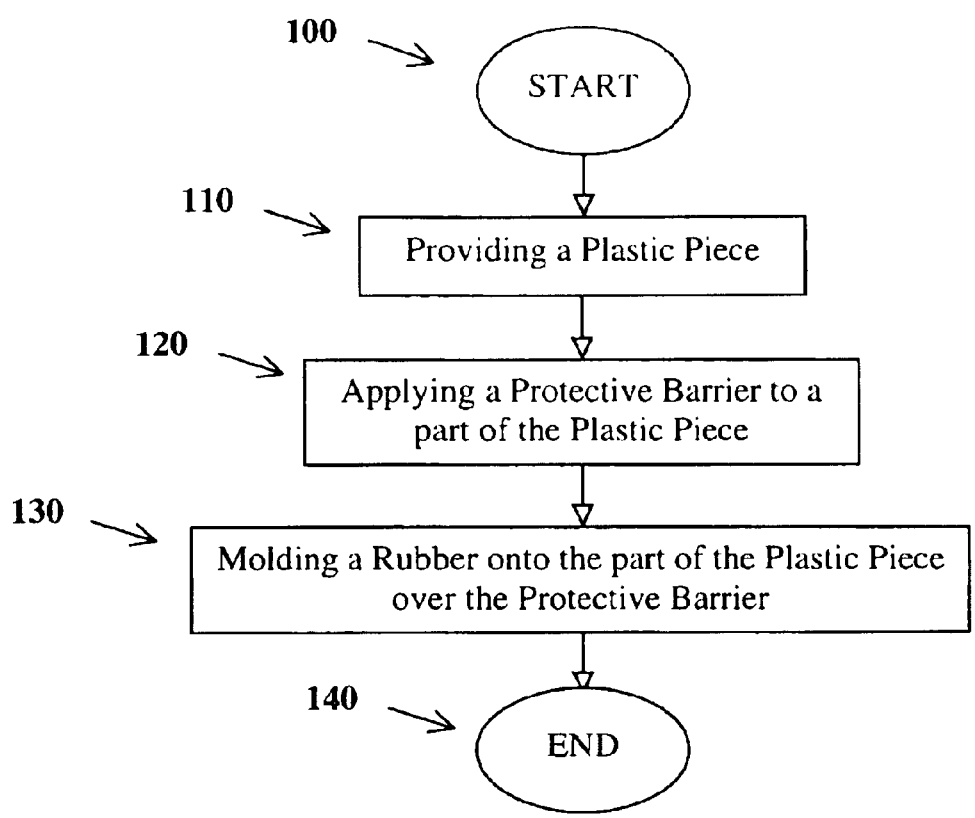
FIG. 1 is a flowchart illustrating one embodiment of a method according to the present invention.

FIG. 1 illustrates one embodiment of a method according to the present invention. Methods according to present invention begin at step 100 by providing a plastic piece 110. The plastic piece, for example, may be a part of a computer casing, or a part of a casing for a computer peripheral, such as a computer keyboard, printer, mouse, scanner, etc. The plastic piece may be made of a polymer resin, such as a polycarbonate resin, a polycarbonate-polyester co-polymer resin, a co-polyester resin, or an ABS (acrylonitrile butadiene styrene) resin. In one embodiment, the plastic piece is translucent. The plastic piece is formed before the methods of the present invention begin, and may be formed by injection molding or other techniques known in the art. The plastic piece typically is allowed to cool down and equilibrate to ambient conditions after being formed.

A protective barrier is then applied to at least a part of the plastic piece in a step 120. The protective barrier according to the present invention typically is applied as a liquid by spraying, brushing, rolling, dipping, etc., or by other techniques known in the art, and typically under ambient conditions. As the liquid dries, the protective barrier solidifies on and adheres to at least the part of the plastic piece. In one embodiment, the protective barrier is a polyurethane coating.

After the protective barrier is applied to at least the part of the plastic piece, a rubber layer is molded onto at least the part of the plastic piece over the protective barrier at step 130. The rubber layer may be made of a polyester rubber, a polyether rubber, or other type of rubber known in the art. In one embodiment, the rubber layer is made of a translucent rubber. In another embodiment, where the rubber layer is made of a translucent rubber, the protective barrier is clear, and so not visible after the rubber layer is molded over at least the part of the plastic piece.

Figure 2:
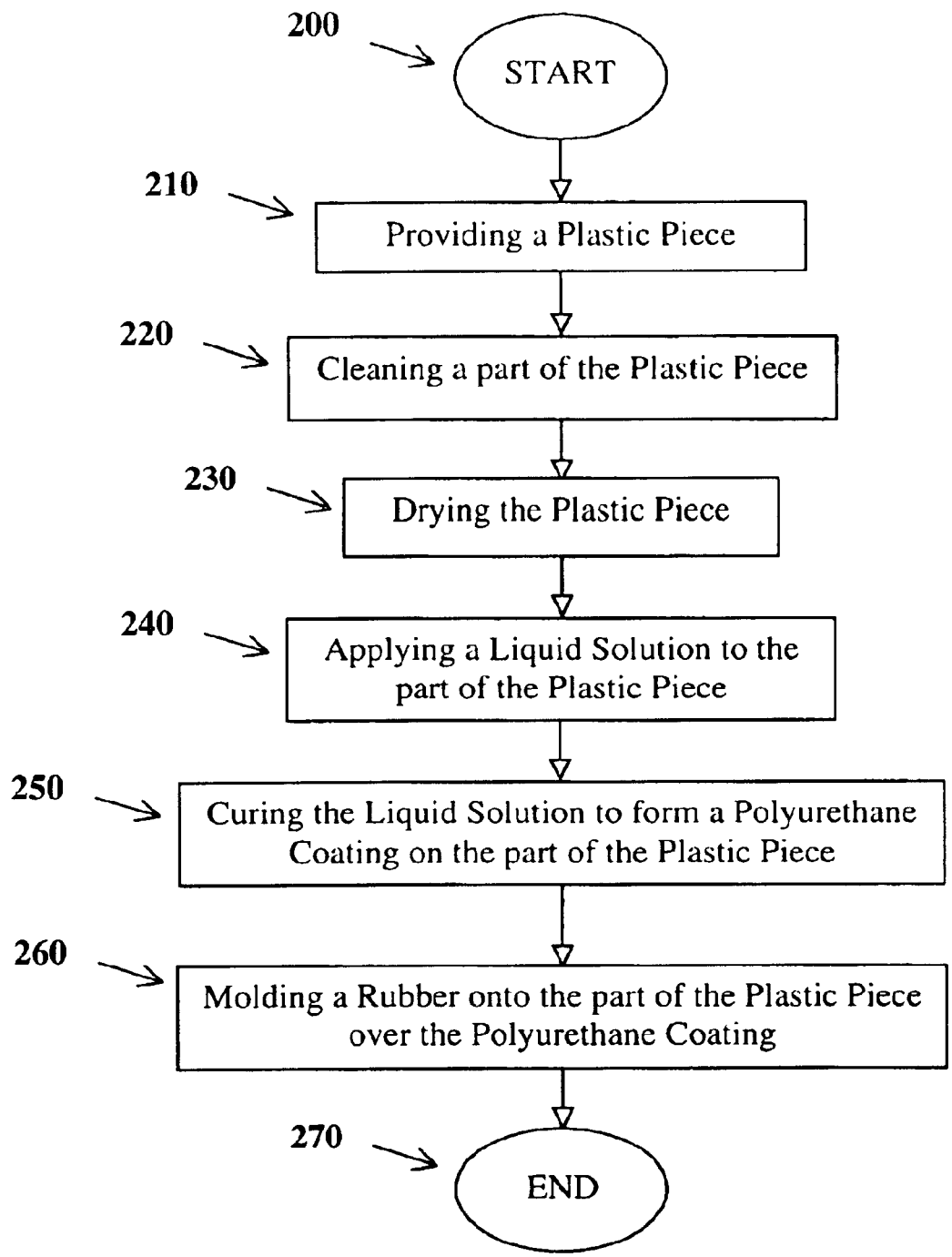
FIG. 2 is a flowchart illustrating another embodiment of a method according to the present invention.

FIG. 2 illustrates another embodiment of a method according to the present invention in which a polyurethane coating provides the protective barrier. As with the embodiment described above, the present embodiment begins at 200 by providing a plastic piece at step 210. In one embodiment, the plastic piece is made of a polycarbonate resin. As described previously, the plastic piece may be formed by injection molding or other techniques known in the art, and typically is allowed to equilibrate to ambient conditions after being formed.

In this embodiment, at least a part of the plastic piece on which the protective barrier will be applied is cleaned at step 220. Dirt, oils, dust and other contaminants that may prevent the protective barrier from adhering to the plastic piece are removed in this step. The part of the plastic piece may be cleaned using a solvent, such as isopropyl alcohol, ethanol, methanol, etc., or other type of cleaner.

The plastic piece is dried at step 230 before the protective coating is applied. Drying removes any residual solvent or cleaner from the plastic piece that may prevent the protective barrier from adhering to the plastic piece. The plastic piece may be dried using compressed air, using heat, such as in an oven, or by other ways known in the art.

After the plastic piece has been cleaned and dried, the protective barrier made of a polyurethane coating is applied to at least the part of the plastic piece at step 240. Polyurethane coatings may be applied as a liquid solution made up of two components, an isocyanate component and a polyol component. When the two components are combined, they react, and the liquid solution begins to dry, or solidify, into a polyurethane. While the solution is liquid, it can be applied to and coated on at least the part of the plastic piece. The liquid solution on at least the part of the plastic piece dries and solidifies to form the polyurethane coating.

Typically, the polyol component is added to the isocyanate component. In one embodiment, the isocyanate component and the polyol component are combined in a ratio of between about 45:55 and about 55:45, either by weight or by volume, to form the liquid solution. In another embodiment, the liquid solution is made up of approximately equal parts, i.e., a ratio of about 50:50, either by weight or by volume, of the isocyanate component and the polyol component.

The polyurethane coating may be applied to at least the part of the plastic piece by spraying, brushing, rolling, dipping, etc., or by other techniques known in the art, and typically is applied under ambient conditions. In one embodiment, the polyurethane coating is applied at a temperature between about 20° and about 30° C. In another embodiment, the polyurethane coating is applied under a relative humidity of less than about 80%.

The polyurethane coating typically is made of an aliphatic polyurethane. In one embodiment, the polyurethane coating is made of an elastomeric polyurethane. In another embodiment, the polyurethane coating is clear.

After being applied to at least the part of the plastic piece, the polyurethane coating is cured, or solidified, 250 before a rubber layer is molded over the polyurethane coating 260. If the polyurethane coating is not completely cured before the rubber layer is molded over it, it may become dislodged or torn as the melted rubber is introduced into the mold and flowed over it. In one embodiment, the polyurethane coating is cured at an elevated temperature higher than the ambient temperature. In another embodiment, the polyurethane coating is cured in an oven at a temperature between about 70° C. and about 90° C. In still another embodiment, the polyurethane coating is cured in an oven at progressively higher temperatures. Curing of the polyurethane coating at an elevated temperature typically takes between about 20 minutes and about 60 minutes.

The protective barrier has a thickness sufficient to protect the plastic piece from being attacked by the rubber layer, but is not so thick as to be dislodged from the plastic piece as the rubber is being molded onto the part of the plastic piece. In one embodiment where the protective barrier is a polyurethane coating, the polyurethane coating has a thickness of between about 0.01 mm and about 0.03 mm. In another embodiment, the polyurethane coating has a thickness of 0.02±0.005 mm.

The methods of the present invention produce plastic pieces with rubber overmoldings that do not attack the underlying plastic piece. The present invention thus provides rubber overmolded plastic pieces with enhanced stability. Where the plastic piece is made of a translucent polymer resin and the rubber layer made of a translucent rubber, the resulting article of manufacture does not form cracks or opaque patches and the aesthetic appearance of the article is maintained over time.

The methods of the present invention have been described with reference to certain embodiments. Those of ordinary skill in the art will recognize that numerous variations, modifications, and improvements can be made to the embodiments described above. The scope of the present invention is not limited to the above embodiments, but is defined by the claims that follow.

What is claimed is:

1. A method of forming a rubber-overmolded plastic casing, the method comprising:

providing a plastic piece comprising a polycarbonate resin, the plastic piece being a part of a casing applying a protective barrier as a liquid solution directly to at least a part of the plastic piece;

curing the liquid solution to form a protective barrier directly on at least the part of the plastic piece; and molding a rubber layer directly onto the protective barrier over the plastic piece.

2. The method as described in claim 1, further comprising, before applying the protective barrier, cleaning at least the part of the plastic piece over which the protective barrier will be applied.

3. The method as described in claim 2 further comprising, after cleaning the part of the plastic piece and before applying the protective barrier, drying the plastic piece.

4. The method as described in claim 1, wherein the plastic piece is translucent.

5. The method as described in claim 1, wherein the casing is a computer casing.

6. The method as described in claim 1, wherein the casing is for a computer peripheral.

7. The method as described in claim 1, wherein the protective coating is applied under ambient conditions.

8. The method as described in claim 1, wherein the protective barrier is thick enough to prevent the rubber layer from attacking the plastic piece.

9. The method as described in claim 1, wherein the protective barrier is clear.

10. The method as described in claim 1, further comprising, before molding the rubber layer over the protective barrier, curing the protective barrier.

11. The method as described in claim 1, wherein the rubber layer is translucent.

12. A method of protecting a plastic piece from reacting with a rubber layer molded over at least a part of the plastic piece, the method comprising:

providing the plastic piece comprising a polycarbonate resin;

cleaning at least the part of the plastic piece;

drying the plastic piece;

after cleaning and drying the plastic piece, applying a liquid solution to at least the part of the plastic piece;

curing the liquid solution to form a polyurethane coating directly on at least the part of the plastic piece; and molding the rubber layer directly onto the polyurethane coating.

13. The method as described in claim 12 wherein at least the part of the plastic piece is cleaned using a solvent.

14. The method as described in claim 13 wherein the solvent is selected from the group consisting of: isopropyl alcohol, ethanol, and methanol.

15. The method as described in claim 12 wherein at least the part of the plastic piece is cleaned using a cleaner.

16. The method as described in claim 12 wherein the plastic piece is dried using compressed air.

17. The method as described in claim 12 wherein the plastic piece is dried in an oven.

18. The method as described in claim 12 wherein the plastic piece is translucent.

19. The method as described in claim 12 wherein the plastic piece is a part of a computer casing.

20. The method as described in claim 12 wherein the plastic piece is a part of a casing for a computer peripheral.

21. The method as described in claim 12 wherein the liquid solution comprises an isocyanate component and a polyol component.

22. The method as described in claim 21 wherein the liquid solution comprises approximately equal parts of the isocyanate component and the polyol component.

23. The method as described in claim 21 wherein the isocyanate component and the polyol component are present in the liquid solution in a ratio of between about 45:55 and about 55:45.

24. The method as described in claim 12 wherein the liquid solution is applied under ambient conditions.

25. The method as described in claim 12 wherein the liquid solution is applied at a temperature between about 20° and about 30° C.

26. The method as described in claim 12 wherein the liquid solution is applied under less than about 80% relative humidity.

27. The method as described in claim 12 wherein the polyurethane coating has a thickness of between about 0.01 and about 0.03 mm.

28. The method as described in claim 12 wherein the polyurethane coating has a thickness of 0.02±0.005 mm.

29. The method as described in claim 12 wherein the polyurethane coating is clear.

30. The method as described in claim 12 wherein the liquid solution is cured at an elevated temperature.

31. The method as described in claim 12 wherein the liquid solution is cured at a temperature between about 70° and about 90° C.

32. The method as described in claim 12 wherein the liquid solution is cured at an elevated temperature for between about 20 and about 60 minutes.

33. The method as described in claim 12 wherein the rubber layer is translucent.

* * * * *